United States Patent [19]

Zimmerman

[11] Patent Number: 4,720,031
[45] Date of Patent: Jan. 19, 1988

[54] SKI RACK

[75] Inventor: Jeff E. Zimmerman, Sacramento, Calif.

[73] Assignee: Sherpa, Inc., Sacramento, Calif.

[21] Appl. No.: 862,076

[22] Filed: May 12, 1986

[51] Int. Cl.⁴ .............................................. B60R 9/04
[52] U.S. Cl. ..................................... 224/323; 224/917
[58] Field of Search ................. 224/917, 323, 324, 319

[56] References Cited

U.S. PATENT DOCUMENTS

| 2,772,824 | 12/1956 | Binding | 224/917 X |
| 3,695,495 | 10/1972 | Parsons | 224/917 X |
| 3,848,785 | 11/1974 | Bott | 224/324 X |
| 4,226,351 | 10/1980 | Biermann et al. | 224/324 X |

FOREIGN PATENT DOCUMENTS

| 2828192 | 1/1979 | Fed. Rep. of Germany | 224/323 |
| 2835734 | 3/1980 | Fed. Rep. of Germany | 224/917 |

*Primary Examiner*—Henry J. Recla
*Assistant Examiner*—Robert M. Petrik
*Attorney, Agent, or Firm*—Townsend and Townsend

[57] ABSTRACT

A ski rack member made to fit on a car top spanning member is disclosed. The car top spanning member is preferably a slotted bar with a female slot therein. The ski rack member has disposed on the bottom portion thereof a complementary and captured male protuberance for fitting within the female slot of the car top spanning member. The disclosed rack member preferably spans half the width of the car top and encloses three pairs of skis. Each ski rack member pivots in a clam shell disposition with upper and lower confronted members. The confronted members together form a hinge on one side, a lock mechanism on the other side and slots for the skis and poles defined at the confronted surfaces of the upper and lower members. Slots for a plurality—and preferably three—skis and poles are defined with a portion of each slot being defined by the upper rack member and the remaining portion be defined by the lower rack member. The slots for receiving the skis are canted, preferably at thirty-seven degrees (37°) from the horizontal. Skis confronted at their skiing surfaces are disposed in an upwardly and downwardly canted angular relationship of minimum vertical profile and greater side-by-side density. Each ski holding slot includes a cantilevered leaf spring to prevent ski vibration.

1 Claim, 4 Drawing Figures

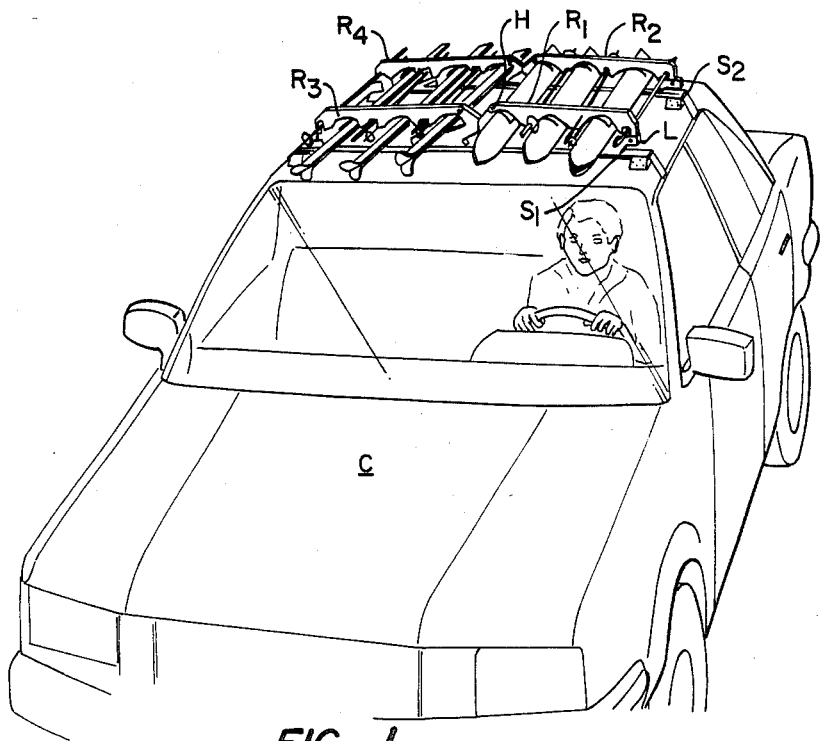
FIG._1.
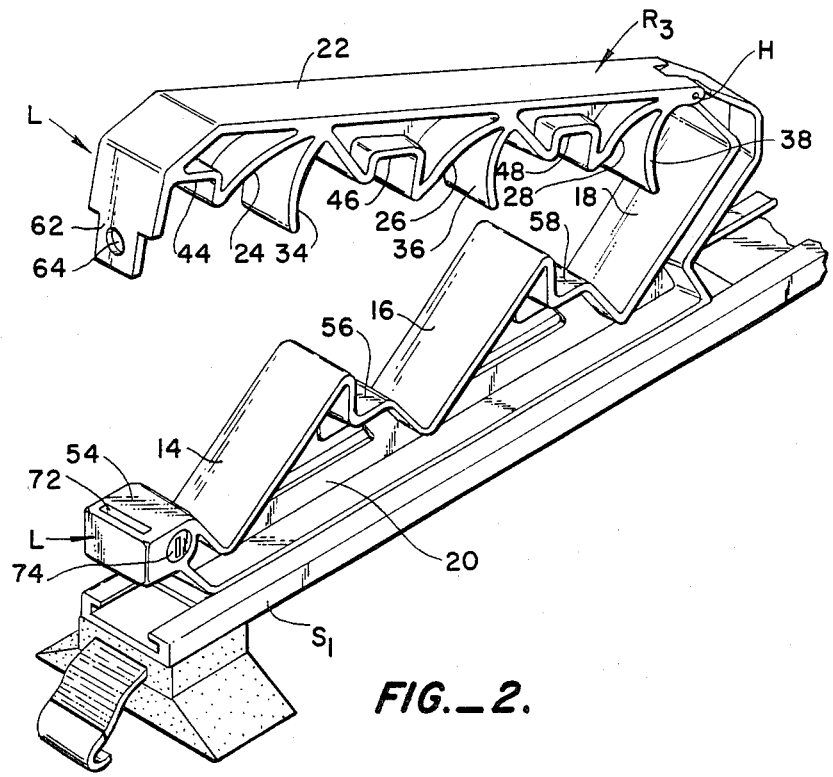
FIG._2.

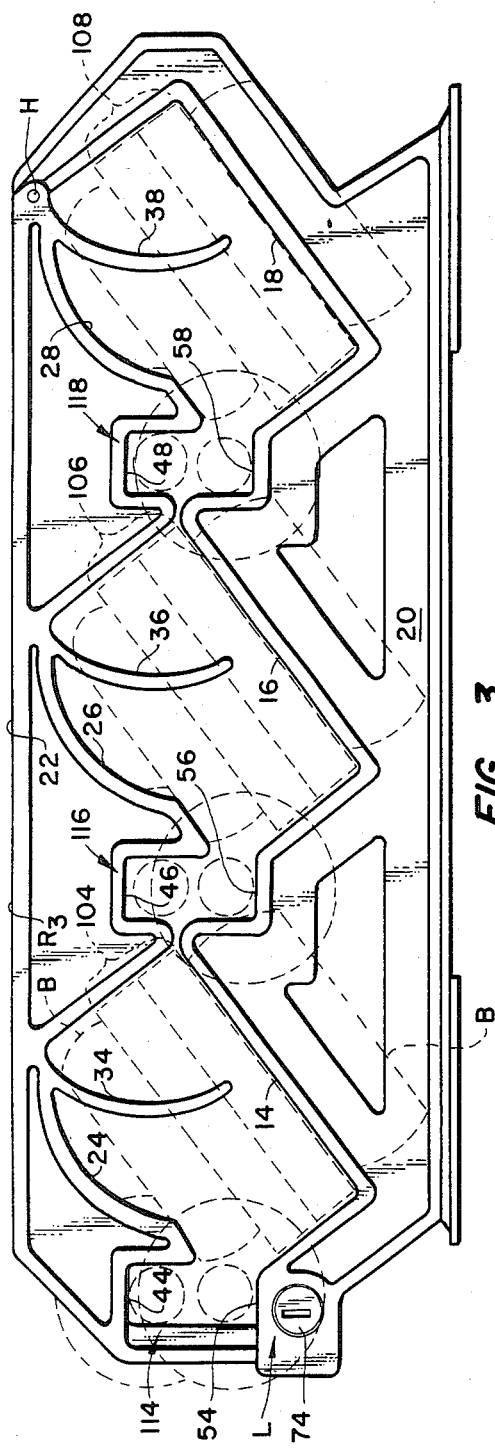
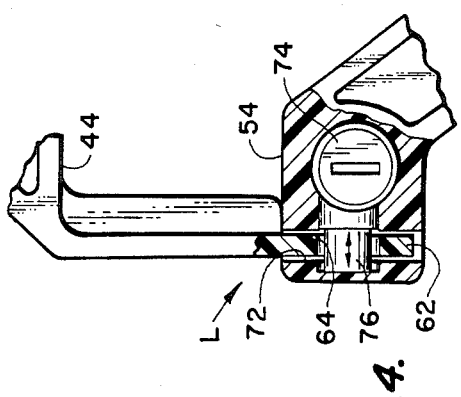

SKI RACK

BACKGROUND OF THE INVENTION

This invention relates to a ski rack.

Description of The Relevant Literature

The ski rack sold under the mark MOHN is known. This ski rack disposes individual skis in side-by-side canted and successively elevated relationship. Although a clam shell like capturing of the skis between two confronting members is disclosed, a high wind profile is presented. Placement of the skis in side-by-side relation was not considered.

Other ski racks are known which dispose the skis either individually or in confronted pairs and in horizontal and parallel relation. Such a ski rack is sold by the Bic Corporation of Paris, France, under the trademark SPORTRACK. Such mounts place the skis with their bindings in direct confronted and interfering relation. Consequently, the side-by-side density to which skis may be placed is less than optimum.

Statement of the Problem

Ski racks must have low wind resistance. This means that the distance that the racks protrude above the top of the automobile must be held to a minimum.

At the same time it is desirable for ski racks to have high density. For example, even though the width of the car is not relatively wide, it is not uncommon for cars to contain six skiers. Therefore, the rack must be capable of likewise holding six pairs of skis.

In the sport of skiing, racks on top of cars are of necessity a place where the rack of skis must be stored. Therefore, the racks must present relatively high theft resistance.

Finally, the ski racks must be the ultimate of simplicity in operation. Cold weather and freezing are to be commonly encountered. Moreover, users of such ski racks have diminished manual dexterity from cold hands. Therefore, rack operation must be maintained at a level of absolute simplicity.

SUMMARY OF THE INVENTION

A ski rack member made to fit on a car top spanning member is disclosed. The car top spanning member is preferably a slotted bar with a female slot therein. The ski rack member has disposed on the bottom portion thereof a complementary and captured male protuberance for fitting within the female slot of the car top spanning member. The disclosed rack member preferably spans half the width of the car top and encloses three pairs of skis. Each ski rack member pivots in a clam shell disposition with upper and lower confronted members. The confronted members together form a hinge on one side, a lock mechanism on the other side and slots for the skis and poles defined at the confronted surfaces of the upper and lower members. Slots for a plurality—and preferably three—skis and poles are defined with a portion of each slot being defined by the upper rack member and the remaining portion be defined by the lower rack member. The slots for receiving the skis are canted, preferably at thirty-seven degrees (37°) from the horizontal. Skis confronted at their skiing surfaces are disposed in an upwardly and downwardly canted angular relationship of minimum vertical profile and greater side-by-side density. Ski bindings in racked and canted skis are disposed in positions of non-interference with maximum possible side-by-side density adjacent racked and similarly canted skis. Provision is made for ski pole insertion interstitially between the skis. Each ski holding slot includes a cantilevered leaf spring to prevent ski vibration. The upper ski rack member, fabricated from hard material, contains an integral lock slotted tongue downwardly disposed from the mass of material forming the ski rack. The locking mechanism is a cylindrical lock with reciprocating bolt which penetrates a complementary slot within the tongue. The bolt and slotted tongue are configured well within the mass of material of the rack. A ski rack member disposed within, capable of working under virtually all adverse and frigid weather conditions encountered in the sport of skiing is set forth.

Other Objects and Advantages

It is an object of this invention to disclose a rack having low vertical profile to the mounted skis. A plurality of preferably, at least three, side-by-side skis concavities are defined between an overlying confronted ski rack segment and an underlying confronted ski rack segment. A plurality—and preferably three—ski pair receiving concavities are defined. Each concavity being sufficiently large to receive a pair of skis, the skis being confronted along their skiing surface. The concavities dispose the working surface of the skis at a 37° tilt from the horizontal, a range of angles from 32° to 42° being acceptable. Ski bindings from confronted pairs of racked skis are disposed angularly upward and angularly downward in a disposition of lowest vertical profile.

An advantage of this aspect of the invention is that the skis with their respective low vertical profile provide reduced wind resistance and wind noise when transported on the top of a moving car.

Yet another advantage of the disclosed ski placement is that the density of skis placed across the roof of a car is increased. Up to six skis can fit in a car of minimum width (43" to 46"—110 cm to 117 cm).

Yet another object of this invention is to disclose in combination with the ski receiving apertures an integrally molded and cantilevered leaf spring. The rack structure in the vicinity of the skis is provided with the cantilevered leaf spring. The leaf spring biases downwardly onto the paired and confronted skis. Movement with the vibration of travel and passing air stream is prevented.

An advantage of the leaf springs is that they assist the rack, when unlocked, in having its upward member move upwardly and away from the skis.

Yet another object of this invention is to disclose a rack having an integral lock which provides a high degree of theft resistance. Specifically, first and second complementary confronting rack members are hinged at one end preferably to and towards the center of the vehicle. The vehicle is preferably provided with forward rack members and rear rack members. The members are confronted when after the skis have been racked and utilized to lock the skis in place. The skis when locked may not be readily removed because their respective tips and bindings prevent withdrawal through the defined apertures within the rack. Typically, the lower member defines a circular block aperture into which a lock plug may be inserted. The upper rack member includes a protruding tongue. The protruding tongue fits into a tongue receiving slot defined within the lower rack member. The inserted lock plug has an outwardly penetrating bolt which penetrates into and through a bolt receiving protuberance defined in the protruding tongue. By the expedient of inserting the tongue from the upper rack within the tongue receiving aperture and having the bolt penetrate the bolt receiving aperture in the tongue when it is well within the plastic material of the rack, there is provided a rack having high resistance to theft.

BRIEF DESCRIPTION OF THE FIGURES

Other objects, features and advantages of this invention will become apparent after referring to the following specification and attached drawings in which:

FIG. 1 is a perspective of full car top with six skis and poles disposed in forward and rear racks of this invention;

FIG. 2 is a perspective of one-half the car top at one rack element showing the rack being opened for removal or insertion of skis and poles;

FIG. 3 is a front elevation of one ski rack illustrating the underlying and overlying rack elements confronted to rack and confronted ski pairs with their bindings in a disposition of minimum vertical profile and maximum side-by-side density; and, FIG. 4 is a detail of the lock area of the ski rack.

DESCRIPTION OF THE PREFERRED EMBODIMENTS

Referring to FIG. 1, a car C having first and second conventional spanning members, S1 and S2, is shown. Four rack members R1, R2, R3 and R4 in accordance with this invention are illustrated.

The rack members are aligned in forward and rear pairs. Specifically, rack member R1 is forward and R2 is rear. Likewise, rack member R3 is forward and R4 is rear. Forward rack members R1 and R3 brace skis at the front of the car. Rear rack members R2 and R4 brace rack member at the rear of the car.

Referring to the case of rack member R1, the rack member includes a hinge H on and towards the center of the car C and a lock member L to and towards the side of the car C.

Having set forth the disposition of the rack, the rack may be further described with respect to FIG. 2.

Referring to FIG. 2, spanning member S1 is illustrated. Rack member R3 is illustrated mounted on spanning members. It includes a lock member L disposed to and towards the side of the car and a hinge H to and towards the center of the car.

Each rack member includes three respective slots, 14, 16 and 18. These slots are preferably canted at an angle which is 53° from the horizontal. As will afterwards be more carefully illustrated with respect to FIG. 3, it will be shown that this angular alignment disposes confronted skis in an optimum disposition. The optimum disposition permits the skis to have a maximum side-by-side density with their accompanying poles as well as to have as low a profile as possible with respect to the top of the car C.

Just as lower rack member 20 defines slots 14, 16 and 18, an upper rack member 22 defines respective and complementary slot members 24, 26, and 28. When upper rack member 22 is confronted to lower rack member 20, ski receiving slots are defined.

Upper rack member 22 defines cantilevered leaf springs. Leaf springs 34, 36, and 38 all protrude into the respective slots 24, 26, and 28.

The purpose of the cantilevered leaf spring can be easily understood. Specifically, confronted skis when placed within the rack can vibrate in the passing wind stream. By the expedient of having the cantilevered leaf springs 34, 36 and 38, a firm bias is applied to the contained skis. This firm bias prevents movement in the wind.

Room for ski poles is provided. Specifically, rectangular apertures 44, 46, and 48 in upper rack member 22 define against respective steps 54, 56, 58 and lower rack member 20, rectangular apertures. It is into these apertures that ski poles may be placed. By the expedient of capturing the handles of the ski poles on one side and the webbing surface of the ski poles on the other side, firm locking of the skis into place occurs.

The locking mechanism L can be easily understood. Specifically, upper ski rack member 22 defines a downwardly protruding tongue 62. Tongue 62 is provided with a bolt receiving concavity 64.

Similarly, lower member 20 defines a tongue receiving concavity 72. A plug lock member 74 fits into the molding adjacent the concavity 72.

Turning briefly to FIG. 4, it can be seen that circular block mechanism 74 has a protruding bolt 76. Bolt 76 is actuated from the circular lock mechanism 74 in a conventional manner by turning a key (not shown). Bolt 76 reciprocates into and out of aperture 72.

Once tongue 62 penetrates the aperture 72, and bolt receiving aperture 64 is aligned with respect to bolt 74, penetration of the bolt 76 firmly locks the assembly in place. Consequently, a thief resistant mechanism is disclosed.

Referring to FIG. 3, rack member R3 is illustrated. Lower member 20 defines slots 14, 16, and 18. Similarly, upper member 22 defines slots 24, 26, and 28. The respective slots 14, 24; 16, 26; and 18, 28 are shown each with confronted pairs of skis. The skis, shown in broken lines, comprise pairs 104, 106, and 108. The skis have protruding bindings B. Those bindings B protrude angularly downward and angularly upward from the respective confronted ski pairs, 104, 106, and 108.

Interstitially of the respective ski pairs, 104, 106, are placed respective pairs of poles 114, 116, and 118. These poles fits interstitially of the ski pairs 104, 106, and 108. It will be noted that the canted angle of the skis disposes the respective bindings so that the poles 114, 116, and 118 may readily fit therebetween.

It will be seen that the slots 14, 16, and 1B are preferably disposed at a 37° angle with respect to the horizontal surface at the top of the car seat. It will be understood that this angle may be varied. Specifically, variations in the range of from 42° to 32° have been found satisfactorily.

It should be understood that the cantilevered leaf springs could be affixed to either member. Likewise, it will be understood that the respective ski pairs and their receiving slots are spaced as closely in side-by-side relation as will be permitted. The chief feature here is that the disclosed angle of canting immediate the horizontal surface of the car permits a higher ski density.

What is claimed is:

1. A ski rack member for receiving confronted pairs of skis with poles on the top of an automobile comprising in combination:

lower ski rack member for spanning immediately over the surface of said automobile;

three side-by-side ski pair receiving slots defined in said lower member for receiving confronted skis with protruding bindings, said slots canted with respect to the surface of said car to an angle, said ski pairs receiving slots disposed in immediately side-by-side relation to permit bindings from said skis to protrude upwardly and downwardly;

three rectilinear pole receiving slots defined in said lower ski rack member interstitially spaced between said ski receiving slots, each slot configured for trapping a ski pole therein;

each rectilinear slot having two side edges and an upwardly exposed bottom edge for receiving and capturing ski poles;

an upper ski rack member confronting said lower ski rack member, said upper ski rack member defining three side-by-side complementary ski pair receiving slots with respect to the ski pair receiving slots of said lower member;

three rectilinear pole receiving slots defined in said upper ski rack member, interstitially spaced between said ski receiving slots and complementary to said rectilinear pole receiving slots in said lower ski rack member whereby ski poles in said upper and lower member are trapped in pairs in said upper and lower slots between said members;

each rectilinear slot having two side edges and a downwardly exposed upper edge for preventing removal of ski poles when said upper and lower ski rack members are confronted;

leaf springs for spring biasing skis in said slots to one boundary of said slots attached to one of said members to prevent movement of said skis within said slots; and, a hinge joining said upper and lower members at one end of said members and a lock joining said upper and lower members at the other end of said members whereby said upper and lower members are movable towards and away from each other to capture poles and skis therebetween;

said lock including one of said members defining a tongue with a bolt receiving aperture;

the other of said members a tongue receiving aperture a bolt mounted to the other of said member for reciprocal movement into and out said tongue receiving aperture into said bolt receiving aperture.

* * * * *